United States Patent
Alsolami et al.

(10) Patent No.: US 11,228,585 B1
(45) Date of Patent: *Jan. 18, 2022

(54) SYSTEMS AND METHODS FOR AUTHENTICATING A USER ACCESSING A USER ACCOUNT

(71) Applicant: King Abdulaziz University, Jeddah (SA)

(72) Inventors: Fahad Alsolami, Jeddah (SA); Nada Alruhaily, Jeddah (SA)

(73) Assignee: KING ABDULAZIZ UNIVERSITY, Jeddah (SA)

(*) Notice: Subject to any disclaimer, the term of this patent is extended or adjusted under 35 U.S.C. 154(b) by 0 days.

This patent is subject to a terminal disclaimer.

(21) Appl. No.: 17/319,352

(22) Filed: May 13, 2021

Related U.S. Application Data

(63) Continuation of application No. 17/155,315, filed on Jan. 22, 2021, now Pat. No. 11,075,901.

(51) Int. Cl.
*H04L 29/00* (2006.01)
*H04L 29/06* (2006.01)
*H04L 29/08* (2006.01)

(52) U.S. Cl.
CPC ........ *H04L 63/083* (2013.01); *H04L 63/0442* (2013.01); *H04L 63/102* (2013.01); *H04L 67/22* (2013.01); *H04L 67/306* (2013.01)

(58) Field of Classification Search
CPC ..... H04L 63/083; H04L 63/102; H04L 67/22; H04L 67/306; H04L 63/0442
See application file for complete search history.

(56) References Cited

U.S. PATENT DOCUMENTS

| | | | | |
|---|---|---|---|---|
| 7,389,917 | B2* | 6/2008 | Abraham | G06Q 20/204 235/382 |
| 7,886,216 | B2* | 2/2011 | Itagaki | H04N 1/00832 715/200 |
| 9,037,858 | B1* | 5/2015 | Juels | H04L 9/085 713/168 |
| 9,185,095 | B1* | 11/2015 | Moritz | H04L 63/0861 |
| 9,882,918 | B1* | 1/2018 | Ford | H04L 67/306 |
| 10,129,269 | B1* | 11/2018 | Ford | G06N 5/04 |
| 10,754,936 | B1* | 8/2020 | Hawes | H04L 67/306 |
| 2007/0127061 | A1* | 6/2007 | Itagaki | H04N 1/0097 358/1.15 |
| 2008/0092209 | A1* | 4/2008 | Davis | G06F 21/316 726/2 |

(Continued)

OTHER PUBLICATIONS

Mat, Onur. "User Behavior Proling using Smartphones"—Master Thesis. Aug. 26, 2011. 59 pages. (Year: 2011).*

*Primary Examiner* — Don G Zhao
(74) *Attorney, Agent, or Firm* — W&C IP

(57) ABSTRACT

Systems and methods are described for authenticating a user accessing a user account. A behavior event associated with a current user using the user account during a session is obtained. The behavior event comprises of keystroke events and mouse events. The obtained behavior event of the current user is compared with a behavior profile of a registered user associated with the user account. The behavior profile comprises keystroke events and mouse events associated with the registered user. The current user is authenticated during the session, when the current user is determined to be the same as the registered user based on the comparison.

10 Claims, 8 Drawing Sheets

(56) References Cited

U.S. PATENT DOCUMENTS

| | | | |
|---|---|---|---|
| 2009/0199264 A1* | 8/2009 | Lang | G06F 21/57 726/1 |
| 2009/0254971 A1* | 10/2009 | Herz | G06Q 30/0603 726/1 |
| 2011/0016534 A1* | 1/2011 | Jakobsson | H04L 67/22 726/28 |
| 2012/0054057 A1* | 3/2012 | O'Connell | G06Q 30/0601 705/26.1 |
| 2012/0054646 A1* | 3/2012 | Hoomani | A63F 13/87 715/758 |
| 2013/0123007 A1* | 5/2013 | Williams | G06F 21/31 463/29 |
| 2013/0191195 A1* | 7/2013 | Carlson | G06Q 30/0224 705/14.17 |
| 2013/0239191 A1* | 9/2013 | Bostick | G06F 21/32 726/7 |
| 2015/0358317 A1* | 12/2015 | Deutschmann | H04W 12/065 713/186 |
| 2016/0314533 A1* | 10/2016 | Brown, III | G06Q 40/06 |
| 2017/0279616 A1* | 9/2017 | Loeb | H04L 67/02 |
| 2017/0300978 A1* | 10/2017 | Narasimhan | G06Q 20/3829 |
| 2018/0033009 A1* | 2/2018 | Goldman | G06Q 40/10 |
| 2018/0033089 A1* | 2/2018 | Goldman | G06Q 40/10 |
| 2018/0314816 A1* | 11/2018 | Turgeman | G06F 21/36 |
| 2018/0351991 A1* | 12/2018 | Jones | H04L 63/107 |
| 2019/0081968 A1* | 3/2019 | Wang | G06F 21/31 |
| 2019/0109875 A1* | 4/2019 | Urmanov | H04L 63/1441 |
| 2019/0236249 A1* | 8/2019 | Pavlou | G06F 16/24578 |
| 2020/0184050 A1* | 6/2020 | Toth | H04L 63/0876 |
| 2020/0184051 A1* | 6/2020 | Toth | G06F 21/32 |
| 2020/0356350 A1* | 11/2020 | Penland | G06F 8/34 |
| 2021/0044578 A1* | 2/2021 | Chan | G06F 21/32 |

* cited by examiner

SYSTEMS AND METHODS FOR AUTHENTICATING A USER ACCESSING A USER ACCOUNT

TECHNICAL FIELD

The present disclosure generally relates to systems and methods for user authentication. In particular, the systems and methods relate to authenticating a current user accessing a user account.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

In recent times, computing services have witnessed a significant shift towards cloud computing which delivers computing services, such as software, servers, virtual machines, storage, databases, development tools, etc. and can be accessed and managed by users from anywhere over the Internet. A user of a cloud service may be assigned a user account, which the user can access using a computing device over the internet.

To protect a user account from unauthorized access, username-password based authentication is widely implemented as a security measure. However, username-password based authentication is generally implemented as a one-time proof of identity when the user login to the user account to gain access to resources associated with the user account. Unfortunately, this type of authentication is based on the assumption that the user remains the same during the entire login session, which may not necessarily be true in events, such as when the user device is left unlocked and unattended. In such events, an unauthorized person may have access to the user account. Further, unauthorized users may have access to user accounts if login credentials, username and the password, are compromised. Moreover, many cloud computing services may be accessed over a public network, such as the Internet, thus making the cloud service user accounts more prone to cyber-attacks and unauthorized access.

Accordingly, it is one object of the present disclosure to provide systems and methods for continuous authentication of a current user accessing the user account. An objective of present disclosure may also be achieved as an additional level of security to the widely used username-password based user authentication of user accounts.

SUMMARY

In an exemplary embodiment, a computer implemented method for authenticating a user accessing a user account is described. The method includes obtaining a behavior event associated with a current user using the user account during a session, wherein the behavior event comprises at least one of keystroke events and mouse events; comparing the obtained behavior event of the current user with a behavior profile of a registered user associated with the user account, wherein the behavior profile comprises at least one of keystroke events and mouse events associated with the registered user; and authenticating, the current user during the session, when the current user is determined to be the same as the registered user based on the comparison.

In another exemplary embodiment, a computer implemented method for registering a behavior profile of a user registered with a user account is described. The method includes obtaining at least one of keystroke events and mouse events of the registered user; generating a behavior profile of the registered user based on the at least one of obtained keystroke events and mouse events; encrypting the behavior profile of the registered user with a first secret key; splitting the first secret key in at least two parts; and providing a first part of the first secret key to the registered user and a second part of the first secret key to a service provider associated with the user account.

In another exemplary embodiment, a system for authenticating a user accessing a user account is described. The system includes a cloud server. The cloud server is communicatively coupled to one or more client devices. The cloud server comprises one or more processors configured to: obtain a behavior event associated with a current user using the user account during a session from the one or more client device, wherein the behavior event comprises at least one of keystroke events and mouse events; compare the obtained behavior event of the current user with a behavior profile of a registered user associated with the user account, wherein the behavior profile comprises at least one of keystroke events and mouse events associated with the registered user; and authenticating, the current user during the session, when the current user is determined to be the same as the registered user based on the comparison.

In another exemplary embodiment, a system for registering a behavior profile of a user registered with a user account is described. The system includes one or more processors configured to: obtain at least one of keystroke events and mouse events of the registered user; generate a behavior profile of the registered user based on the at least one of obtained keystroke events and mouse events; encrypt the behavior profile of the registered user with a first secret key; split the first secret key in at least two parts; and provide a first part of the first secret key to the registered user and a second part of the first secret key to a service provider associated with the user account.

The foregoing general description of the illustrative aspect of the present disclosures and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
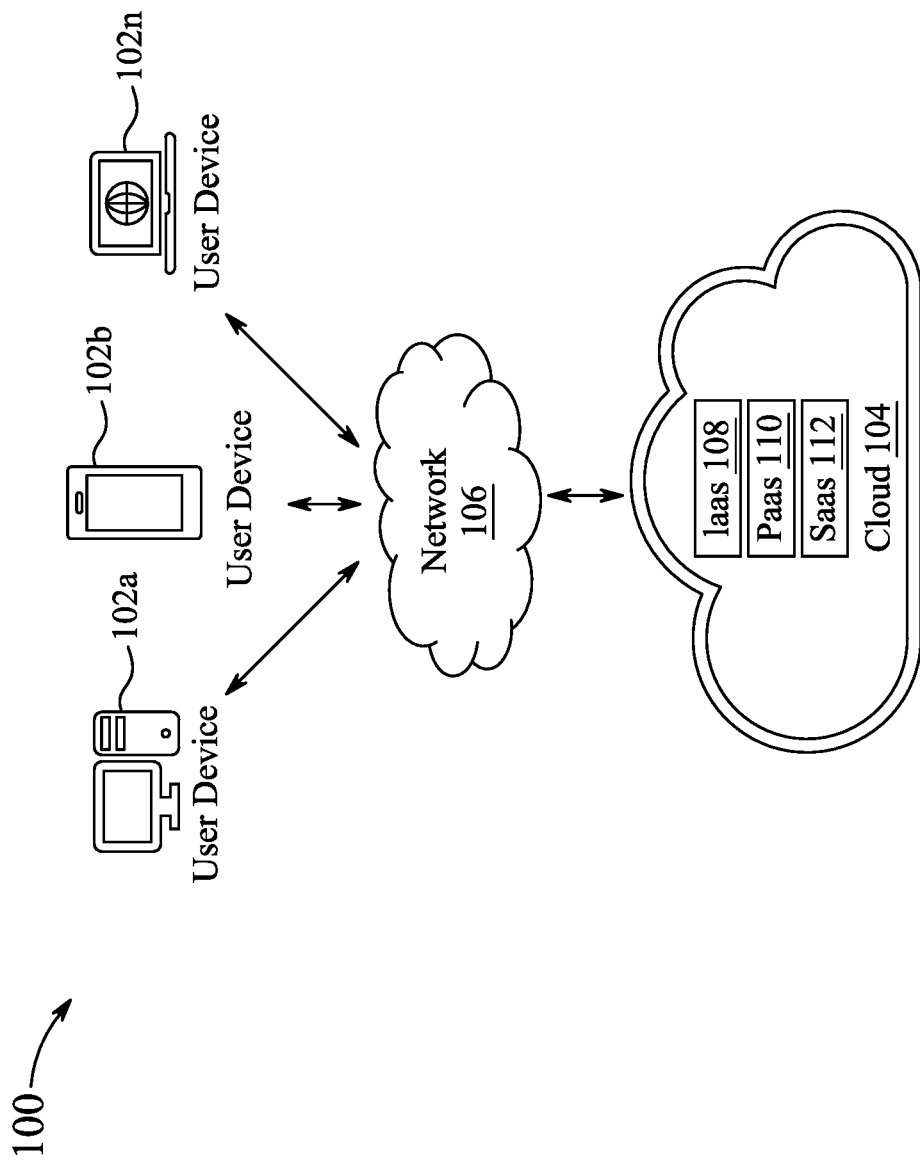
FIG. 1 depicts a cloud computing environment comprising user devices in communication with a cloud platform, according to exemplary aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to a method and a system for authenticating a user accessing a user account. The present disclosure determines whether a user accessing a user account is the registered user of the user account thereby ensuring detection of an unauthorized user accessing the user account and preventing cyber-security threats such as data breach and theft from an unauthorized user gaining access to the user account.

FIG. 1 depicts a cloud computing environment 100 for authenticating a user accessing a user account, according to exemplary aspects of the present disclosure.

According to aspects of the present disclosure, the cloud computing environment 100 may include one or more user devices 102a-102n (hereinafter collectively referred to as user devices 102, client devices 102, and individually referred to as a user device 102, a client device 102), a cloud 104, and a network 106 enabling communication between the components of the cloud computing environment 100 for information exchange. In an example, each user device 102 may be in periodic or ongoing communication with cloud 104 through network 106.

User devices 102 may be any computing system, such as workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. In some aspects of the present disclosure, one or more web browsing applications or client-side applications may be installed in user device 102 that may enable a user to access one or more resources or cloud computing services provided by cloud 104.

The cloud computing environment 100 may provide a user device 102 with one or more resources or cloud computing services provided by cloud 104. User devices 102 may include, e.g., thick clients, thin clients, and zero clients. A thick client may provide at least some functionality even when disconnected from cloud 104. A thin client or zero client may depend on the connection to cloud 104 to provide functionality. A zero client may depend on cloud 104 to retrieve operating system data for user device 102. Cloud 104 may include back end platforms, e.g., servers, storage, server farms, or data centers.

Cloud 104 may be public, private, or hybrid. In public clouds, the cloud resources (e.g. servers and storage) are owned and operated by third-party cloud service providers and may be shared by more than one organization, business, or user. The cloud resources may be located off-site and delivered to user devices 102 over a public network such as the Internet. With a public cloud, all hardware, software and other supporting infrastructure may be owned and managed by the cloud service provider. Private clouds may include cloud resources used exclusively by one business or organization. The private cloud may be physically located at the organization's on-site datacenter or may be hosted by a third-party service provider. With a private cloud, the cloud resources may be delivered to user devices 102 over a private network. A hybrid cloud is a type of cloud computing that combines a private cloud with a public cloud and may include both the private and public networks. Hybrid clouds allow data and applications to move between the two cloud environments.

Cloud 104 may also include a cloud-based delivery, e.g. Infrastructure as a Service (IaaS) 108, Platform as a Service (PaaS) 110, and Software as a Service (SaaS) 112. IaaS 108 may refer to a user renting the infrastructure resources that are needed during a specified time period. IaaS providers may offer storage, networking, servers or virtualization resources from large pools, allowing the users to quickly scale up by accessing more resources as needed. Examples of IaaS include Amazon Web Services™ (AWS) provided by Amazon, Inc. of Seattle, Wash., Rackspace™ Cloud provided by Rackspace Inc. of San Antonio, Tex., Google Compute Engine™ provided by Google Inc. of Mountain View, Calif., or RightScale™ provided by RightScale, Inc. of Santa Barbara, Calif. PaaS 110 may offer functionality associated with various cloud resources, including, e.g., storage, networking, servers, virtualization or containerization, as well as additional resources, e.g., the operating system, middleware, or runtime resources. PaaS 110 may deliver a framework that developers may build upon and use to create applications. Examples of PaaS 110 include Windows Azure™ provided by Microsoft Corporation of Redmond, Wash., Google App Engine™ provided by Google Inc., and Heroku™ provided by Heroku, Inc. of San Francisco Calif. SaaS 112 may offer the resources, including storage, networking, servers, virtualization, operating system, middleware, or runtime resources. In an aspect of the present disclosure, SaaS 112 may offer additional resources including, e.g., data and application resources. Examples of SaaS 112 include Google Apps™ provided by Google Inc., Salesforce™ provided by Salesforce.com Inc. of San Francisco, Calif., or Office365™ provided by Microsoft Corporation. Examples of SaaS 112 may also include storage providers, e.g. Dropbox™ provided by Dropbox Inc. of San Francisco, Calif., Microsoft OneDrive™ provided by Microsoft Corporation, Google Drive™ provided by Google Inc., or Apple iCloud™ provided by Apple Inc. of Cupertino, Calif.

User devices 102 may access IaaS resources with one or more IaaS standards, including, e.g., Amazon Elastic Compute Cloud™ (EC2), Open Cloud Computing Interface (OCCI), Cloud Infrastructure Management Interface (CIMI), or OpenStack standards. Some IaaS standards may allow clients access to resources over Hypertext Transfer Protocol (HTTP) and may use Representational State Transfer (REST) protocol or Simple Object Access Protocol (SOAP). User devices 102 may access PaaS resources with one or more PaaS interfaces. The one or more PaaS interfaces may use for example HTTP packages, standard Java Application Program Interfaces (APIs), JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. User devices 102 may access SaaS resources using web-based user interfaces, provided by a web browser (e.g. Google Chrome™, Microsoft Internet Explorer™, or Mozilla Firefox™ provided by Mozilla Foundation of Mountain View, Calif.). User devices 102 may also access SaaS resources through smartphone or tablet applications, including e.g., Salesforce Sales Cloud™, or Google Drive App™. User devices 102 may also access SaaS resources through the client operating system, including e.g. Windows file system for Dropbox™.

In some aspects of the present disclosure, access to IaaS 108, PaaS 110, or SaaS 112 resources may be authenticated. For example, a server or an authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

In some aspects of the present disclosure, network 106 may be a wireless network, a wired network, or a combination thereof. Network 106 may also be an individual network or a collection of many such individual networks, interconnected with each other and functioning as a single large network, e.g., the Internet or an intranet. Network 106 may be implemented as one of the different types of networks, such as intranet, local area network (LAN), wide area network (WAN), the internet, and the like. Network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, network 106 may include a variety of network devices, including routers, bridges, servers, computing devices, storage devices, and the like.

Figure 2:
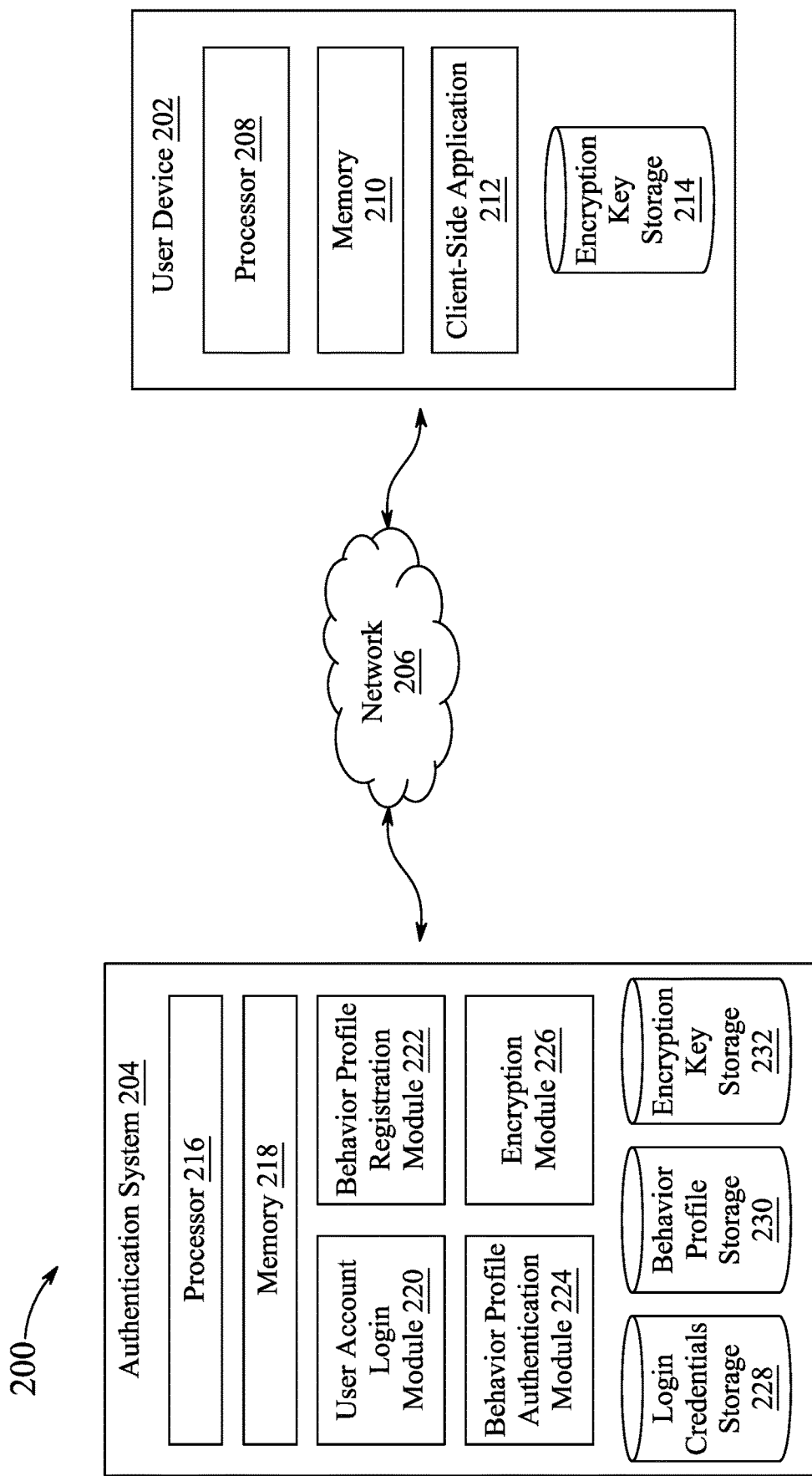
FIG. 2 depicts an implementation of a system for authenticating a user accessing a user account, according to exemplary aspects of the present disclosure.

FIG. 2 depicts an implementation of system 200 for authenticating a user accessing a user account, according to exemplary aspects of the present disclosure.

System 200 may include a user device 202, an authentication system 204, and a network 206 enabling communication between the system components. User device 202 may be an example or instance of user devices 102 shown in FIG. 1, the details of which are provided with reference to FIG. 5, FIG. 6, and FIG. 7 and their accompanying description. Authentication system 204 may refer to an authentication system hosted on a cloud platform, such as cloud 104 of FIG. 1, provided by a cloud service provider. The cloud service provider may provide cloud computing services to one or more users. Each of one or more users may be authorized to access the cloud computing services by logging to respective user accounts. One or more users may access their respective user accounts from a user device, such as user device 202 via network 206. Authentication system 204 may provide authentication of a current user accessing the user account. Network 206 may be an example or instance of network 106, the details of which are provided with reference to FIG. 1 and its accompanying description.

According to some aspects of the present disclosure, authentication system 204 may register and store a behavior profile and login credentials of a registered user authorized to access a user account from user device 202, authenticate a user to provide access to the user account using the login credentials, authenticate that a current user accessing the user account is the registered user using the behavior profile, and manage any other function associated with authentication system 204.

In some aspects of the present disclosure, a system administrator may be a professional managing cybersecurity aspect of an organization or cloud service provider. The system administrator may oversee and manage authentication system 204 to ensure cybersecurity goals are met. In an aspect of the present disclosure, the system administrator may be assigned login credentials to access authentication system 204.

Figure 5:
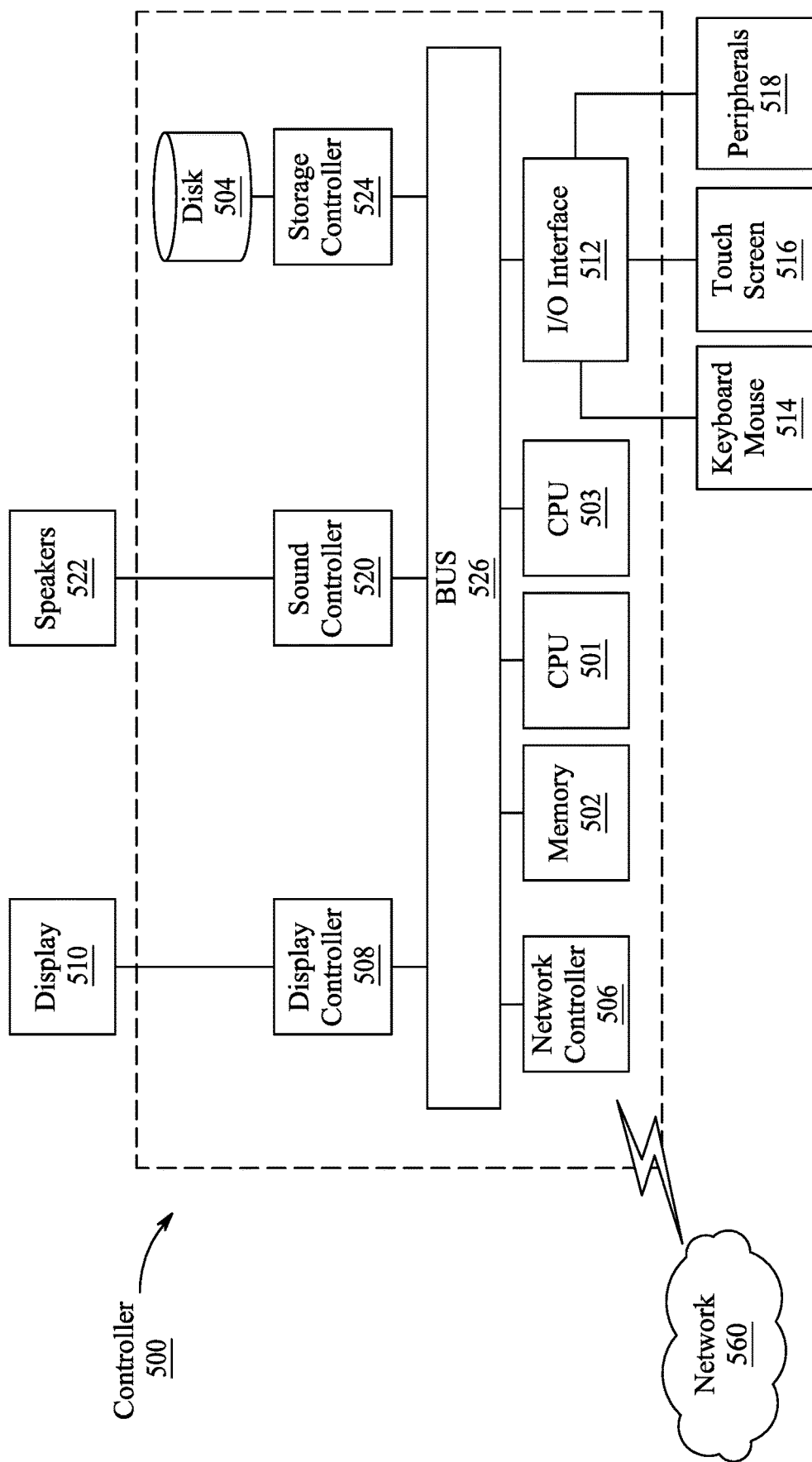
FIG. 5 is an illustration of a non-limiting example of details of computing hardware used in the computing system, according to exemplary aspects of the present disclosure.
Figure 6:
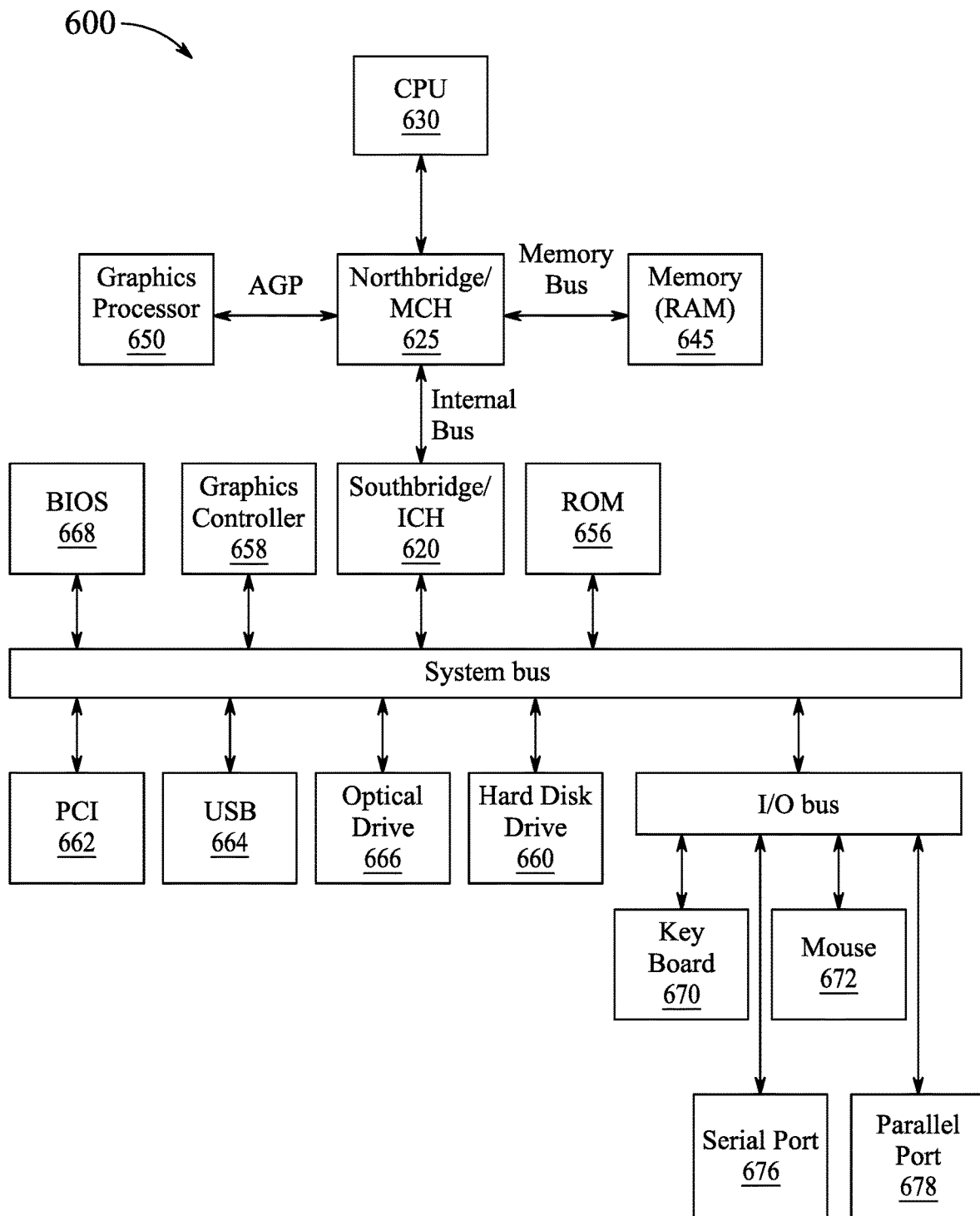
FIG. 6 is an exemplary schematic diagram of a data processing system used within the computing system, according to exemplary aspects of the present disclosure.
Figure 7:
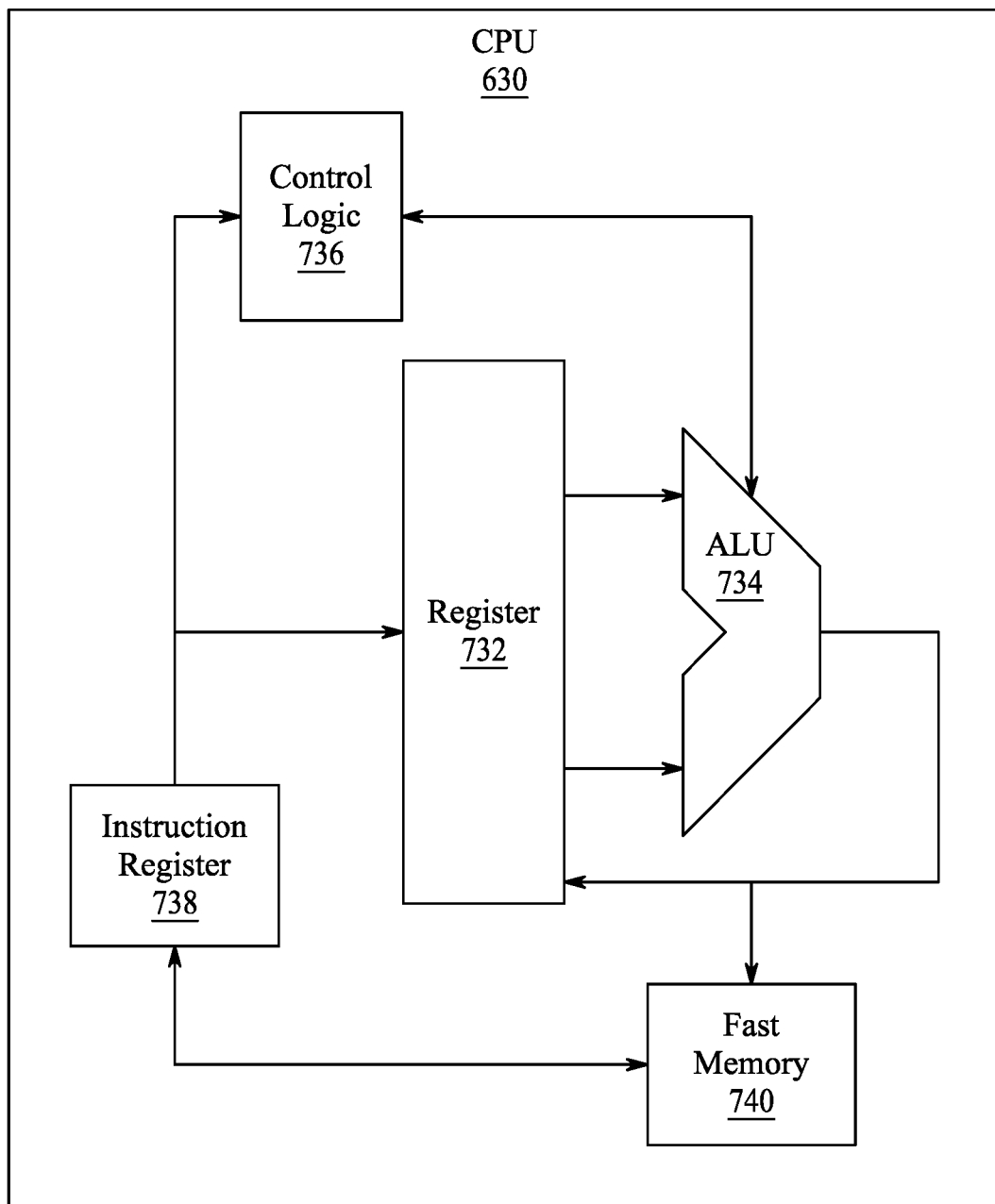
FIG. 7 is an exemplary schematic diagram of a processor used with the computing system, according to exemplary aspects of the present disclosure.

Authentication system 204 may be implemented in a variety of computing systems, such as a mainframe computer, a server, a network server, a laptop computer, a desktop computer, a notebook, a workstation, and any other computing system, the details of which are provided with reference to FIG. 5, FIG. 6, and FIG. 7 and their accompanying description. In some aspects of the present disclosure, authentication system 204 may be communicatively coupled with user device 202 through network 206 for exchanging information. In some aspects of the present disclosure, authentication system 204 may be implemented in one or more cloud-based servers hosted by a cloud service provider, such as cloud 104 shown in FIG. 1. In some aspects of the present disclosure, authentication system 204 may be implemented as a part of a cluster of servers. In some aspects of the present disclosure, authentication system 204 may be implemented across a plurality of servers, thereby tasks performed by authentication system 204 may be performed by the plurality of servers. These tasks may be allocated among the cluster of servers by an application, a service, a daemon, a routine, or other executable logic for task allocation. In some implementations, authentication system 204 may be implemented in user device 202.

In some aspects of the present disclosure, authentication system 204 may facilitate authenticating whether a current user accessing the user account is the registered user based on the behavior profile of the registered user. An unauthorized user may gain access to the user account in events, such as, the registered user logs in to the user account and leaves user device 202 unattended, compromised login credentials associated with the user account, and various other events.

According to some aspects of the present disclosure, user device 202 may include processor 208 and memory 210. User device 202 may further include client-side application 212, and encryption key storage 214. Client-side application 212 may be an application installed on user device 202. In an aspect of the present disclosure, client-side application 212 may be an application that can be accessed over network 206 through a browser without requiring any installation on user device 202. In an aspect of the present disclosure, client-side application 212 may be an instance of one or more resources or cloud computing services provided by cloud 104. In an aspect of the present disclosure, client-side application 212 may provide an interface for a registered user to login to a user account to access the one or more resources or cloud computing services provided by cloud 104. In an example, a user of user device 202 may select, purchase and/or download client-side application 212, through for example, an application distribution platform. Note that as used herein, the term "application" may refer to one or more applications, services, routines, or other executable logic or instructions. In some aspects of the present disclosure, encryption key storage 214 may be implemented using one or more data storage means including, but not limited to, Solid-State drives (SSD), Hard drives, Optical storage devices, and Magnetic storage devices.

According to some aspects of the present disclosure, authentication system 204 may include processor 216 and memory 218. Authentication system 204 may further include user account login module 220, behavior profile registration module 222, behavior profile authentication module 224, and encryption module 226. In an implementation, user account login module 220, behavior profile registration module 222, behavior profile authentication module 224, and encryption module 226, may be coupled to processor 216 and memory 218. In some aspects of the present disclosure, user account login module 220, behavior profile registration module 222, behavior profile authentication module 224, and encryption module 226, amongst other modules, may include routines, programs, objects, components, and data structures which may perform particular tasks or implement particular abstract data types. User account login module 220, behavior profile registration module 222, behavior profile authentication module 224, and encryption module 226, may also be implemented as, signal processor(s), state machine(s), logic circuitries, and/or any other device or component that manipulates signals based on operational instructions.

In some aspects of the present disclosure, user account login module 220, behavior profile registration module 222, behavior profile authentication module 224, and encryption module 226 may be implemented in hardware, instructions executed by a processing unit, or by a combination thereof. The processing unit may comprise a computer, a processor, a state machine, a logic array or any other suitable devices capable of processing instructions. The processing unit may be a general-purpose processor which executes instructions to cause the general-purpose processor to perform the required tasks or, the processing unit may be dedicated to perform the required functions. In some aspects of the present disclosure, user account login module 220, behavior profile registration module 222, behavior profile authentication module 224, and encryption module 226 may be machine-readable instructions which, when executed by a processor/processing unit, for example, processor 216, perform any desired functionalities. The machine-readable instructions may be stored on an electronic memory device, hard disk, optical disk or other machine-readable storage medium or non-transitory medium. In an implementation, the machine-readable instructions may also be downloaded to the storage medium via a network connection. In an example, machine-readable instructions may be stored in memory 218.

According to some aspects of the present disclosure, authentication system 204 may further include login credentials storage 228, behavior profile storage 230, and encryption key storage 232. In some aspects of the present disclosure, login credentials storage 228, behavior profile storage 230, and encryption key storage 232 may be implemented using one or more data storage means, such as Solid-State drives (SSD) flash, or Hard drives. To improve the responsiveness of the cloud architecture, the data is preferentially stored, either wholly or partly, on SSD i.e. Flash storage. In an aspect of the present disclosure, flash storage is selected/configured from an existing cloud provider such as Microsoft™ or Amazon™. In another aspect of the present disclosure the existing cloud network operator such as Microsoft™ or Amazon™ is configured to store all data to a Flash based cloud storage operator, such as Pure Storage™, EMC™, Nimble™ storage or the like.

User account login module 220 may verify login credentials, such as a user id and a password associated with the registered user of the user account. In some aspects of the present disclosure, the login credentials may include biometric authentication data corresponding to various biometric authentication techniques including, but not limited to, fingerprint recognition, iris scanning, facial recognition, and vein pattern recognition. In some aspects of the present disclosure, user account login module 220 may verify the login credentials provided by a user using user device 202 to grant the user access to the user account. User account login module 220 may match login credentials provided by the user with login credentials stored in login credentials storage 228. Based on the match, user account login module 220 may grant the user access to the user account. In some aspects of the present disclosure, login credentials storage 228 may store the login credentials of users corresponding to a plurality of user accounts.

Behavior profile registration module 222 may include various functionalities that may be associated with registering a behavior profile of a user registered with the user account. In some aspects of the present disclosure, behavior profile registration module 222 may be an application or a program that manages various aspects of generating a behavior profile of the registered user of the user account.

In some aspects of the present disclosure, behavior profile registration module 222 may generate behavior profile of the registered user of the user account. In some aspects of the present disclosure, behavior profile of the registered user may include at least one of keystroke events and mouse events associated with the registered user. The keystroke events associated with a user may include, but are not limited to, time duration for which a key is pressed and time duration between consecutive keystrokes. In some aspects of the present disclosure, time duration between consecutive keystrokes may correspond to time duration between one or more pre-defined set of keys. The pre-defined set of keys may correspond to a pair of keys that are proximate to each other on the keyboard, a pair of keys that are far from each other on the keyboard, a pair of keys proximate to one or more fingers on one or both the hands of the user. In some aspects of the present disclosure, the keystroke events may further include time duration for typing one or more specific keywords, such as frequently typed words and pre-defined words.

The mouse events associated with a user may include, but are not limited to, time duration between mouse button press and release for a single click action, time duration between mouse button press and release for each click for a double click action, time duration between first mouse button release and second mouse button press for a double click action, a sequence of mouse movement actions, a mouse drag and drop action, i.e. mouse button press event followed by mouse movement actions and mouse button release event, and a scroll action. In some aspects of the present disclosure, the mouse events may also refer to similar events associated with pointing devices, such as a touchpad.

In some aspects of the present disclosure, a registered user may login to a registered user account using one or more login credentials. The user account may be associated with a cloud service provided by a cloud service provider. Behavior profile registration module 222 may initiate a behavior profile set-up phase to generate the behavior profile of the registered user associated with the user account. In an aspect of the present disclosure, the behavior profile set-up phase may be initiated in response to a user request for registering the behavior profile. In another aspect of the present disclosure, the user may be prompted by behavior profile registration module 222 to register the behavior profile of the user by initiating a registration process.

In some aspects of the present disclosure, to generate the behavior profile of the registered user, behavior profile registration module 222 may obtain one or more of keystroke events $k_i$, one or more of mouse events $m_i$, or both. The keystroke events $k_i$ and the mouse events $m_i$ may be generated as a result of the registered user interacting with user device 202 using a keyboard and a mouse. In some aspects of the present disclosure, the mouse and the keyboard may be an integral part of user device 202 or may be externally connected to user device 202 using various wireless or wired connection protocols. In some aspects of the present disclosure, behavior profile registration module 222 may perform one or more feature extraction techniques to extract keystroke events feature and mouse events feature. In some aspects of the present disclosure, behavior profile registration module 222 combines the keystroke events feature and the mouse events feature to generate the behavior profile of the registered user.

Encryption module 226 may encrypt the behavior profile of the registered user using a secret key $K_i$. In an aspect of the present disclosure, encryption module 226 may store the encrypted behavior profile of the registered user in behavior profile storage 230. In an aspect of the present disclosure, encryption module 226 may apply a secret sharing scheme, for example, Shamir's Secret Sharing algorithm to encrypt the secret key $K_i$ and split the encrypted secret key into two parts. In some aspects of the present disclosure, a first part of the encrypted secret key may be stored in encryption key storage 232 and a second part of the encrypted secret key may be shared with the registered user. The second part of the encrypted secret key may be stored at the registered user's end, such as encryption key storage 214 of user device 202. In some aspects of the present disclosure, encryption module 226 may use various other secret sharing schemes known in the art to encrypt the secret key $K_i$.

According to some aspects of the present disclosure, during the set-up phase a predetermined number of the keystroke events and the mouse events may be collected to generate the behavior profile of the registered user. In some aspects of the present disclosure, the set-up phase may be initiated during one or more login sessions, i.e. the keystroke events and the mouse events may be collected during one or more login sessions to generate the behavior profile of the registered user. In some aspects of the present disclosure, number of login sessions required to generate the behavior profile of the registered user may depend on usage time for which the registered user accesses the user account. For example, more the usage time for which the registered user accesses the user account, less is the number of login sessions required to generate the behavior profile of the registered user. In some aspects of the present disclosure, the keystrokes events and the mouse events may be collected during one or more login sessions and at one or more time intervals in a login session to create a comprehensive and accurate behavior profile of the registered user.

In some aspects of the present disclosure, during the set-up phase, behavior profile registration module 222 may prompt the registered user to perform one or more actions using at least one of the keyboard and the mouse to generate the behavior profile of the registered user. The one or more actions associated with the mouse may include performing a single click action, a double click action, a scroll action, a sequence of mouse movement actions, and drag and drop action. The one or more actions associated with the keyboard may include entering one or more predetermined keywords.

In some aspects of the present disclosure, the system administrator or the cloud service provider may configure behavior profile registration module 222 to define a number of keystroke events and a number of mouse events which are sufficient to generate the behavior profile of the registered user.

According to some aspects of the present disclosure, after the behavior profile of the registered user is generated, behavior profile registration module 222 may generate a set of detectors $D_i$ from the behavior profile of the registered user stored in behavior profile storage 230. In an aspect of the present disclosure, behavior profile registration module 222 may retrieve the first part of the encrypted secret key stored in encryption key storage 232 of authentication system 204 and receive the second part of the encrypted secret key from the user's end. Behavior profile registration module 222 may regenerate the secret key $K_i$ by applying the appropriate secret sharing algorithm to combine the first part of the encrypted secret key and the second part of the encrypted secret key, for e.g. Shamir's Secret Sharing algorithm. Behavior profile registration module 222 may use the secret key $K_i$ to decrypt the encrypted behavior profile of the registered user stored in behavior profile storage 230.

In an aspect of the present disclosure, when the registered user accesses the user account, behavior profile registration module 222 may apply an Artificial Immune System (AIS) Negative Selection (NS) algorithm to generate a set $D_i$ of detectors which represent the behavior of self detectors & non-self detectors. When generating the set $D_i$ of detectors using negative selection algorithm, any detector that detects a self-element is removed from the set $D_i$ and only detectors which detect the non-self elements are included in the set $D_i$. In some aspects of the present disclosure, the set $D_i$ of non-self detectors may be encrypted with the secret key $K_i$ and may be stored in behavior profile storage 230 for authenticating a user accessing the user account. In an aspect of the present disclosure, behavior profile registration module 222 may store the encrypted set $D_i$ of non-self detectors of the registered user in behavior profile storage 230. In an aspect of the present disclosure, encryption module 226 may apply a secret sharing scheme, for e.g. Shamir's Secret Sharing to encrypt the secret key $K_i$ and split the encrypted secret key into two parts. In some aspects of the present disclosure, encryption module 226 may use various other secret sharing schemes known in the art to encrypt the secret key $K_i$. In some aspects of the present disclosure, a first part of the encrypted secret key may be stored in encryption key storage 232 of authentication system 204 and a second part of the encrypted secret key may be shared with the registered user. The second part of the encrypted secret key may be stored at the registered user's end, such as encryption key storage 214 of user device 202.

In an aspect of the present disclosure, the set $D_i$ of detectors is generated for one or more login sessions of the user account being accessed by the registered user. In an aspect of the present disclosure, the set $D_i$ of detectors is generated for a predetermined period of time during each of the one or more login sessions.

According to some aspects of the present disclosure, the authentications system 204 includes behavior profile authentication module 224. In an aspect of the present disclosure, behavior profile authentication module 224 may continuously authenticate a current user accessing the user account. In some aspects of the present disclosure, continuously authenticating a current user may refer to one or more of: repeatedly authenticating the current user at predetermined time intervals during a login session and authenticating the current user when one or more suspicious activities related to the user account are detected during a login session. In some aspects of the present disclosure, the one or more suspicious activities may include copying data from the user account, accessing secret files or folders maintained in the user account, and any other activity defined as suspicious by the system administrator or the cloud service provider.

In some aspects of the present disclosure, a user may login to the user account using the login credentials. In response to the user account login, behavior profile authentication module 224 may initiate continuous authentication of a current user accessing the user account during the login session. Behavior profile authentication module 224 may retrieve the encrypted set $D_i$ of non-self detectors of the registered user from behavior profile storage 230. Behavior profile authentication module 224 retrieves the first part of the encrypted secret key stored in encryption key storage 232 and receives a second part of the encrypted secret key stored at the registered user's end, e.g., encryption key storage 214 of user device 202. Behavior profile authentication module 224 may generate the secret key $K_i$ using the first part of the encrypted secret key and the second part of the encrypted secret key. Behavior profile authentication module 224 may use the secret key Ki to decrypt the encrypted set $D_i$ of non-self detectors of the registered user.

In some aspects of the present disclosure, during a login session, behavior profile authentication module 224 may collect one or more of keystroke events $k_j$, one or more of mouse events $m_j$, or both of a current user accessing the user account. The keystroke events $k_j$ and mouse events $m_j$ may be generated as a result of the current user interacting with user device 202 using the keyboard and the mouse. Behavior profile authentication module 224 may extract keystroke events feature and mouse events feature from the keystroke events $k_j$ and mouse events $m_j$, respectively of the current user. Behavior profile authentication module 224 may combine the keystroke events feature and the mouse events feature of the current user to generate the behavior profile of the current user.

In some aspects of the present disclosure, to authenticate the current user accessing the user account during the login session, behavior profile authentication module 224 uses the set $D_i$ of non-self detectors of the registered user to analyze the keystroke events and mouse events of the current user. Based on the analysis, behavior profile authentication module 224 counts a number of non-self patterns identified by the set $D_i$ of non-self detectors.

In an aspect of the present disclosure, if the number of non-self patterns is less than or equal to a pre-determined threshold, the current user is determined to be the same as the registered user of the user account. In such an aspect, the login session of the user account may continue, and the current user may continue to access the user account.

In an aspect of the present disclosure, if the number of non-self patterns is greater than the pre-determined threshold, the current user is determined as not being the registered user of the user account. In such an aspect, behavior profile authentication module 224 may end the login session of the user account and the current user may be logged out of the user account.

In some aspects of the present disclosure, during the login session, behavior profile authentication module 224 analyzes the keystroke events and mouse events of the current user at predetermined time intervals to determine if the current user is the same as the registered user. In some aspects of the present disclosure, the predetermined time intervals to authenticate the current user is set by the system administrator. In some aspects of the present disclosure, the predetermined time intervals at which the current user is authenticated is determined based on one or more of: computing resources associated with the cloud computing services and number of different user accounts that are simultaneously in session.

In some aspects of the present disclosure, behavior profile authentication module 224 analyzes the keystroke events and mouse events of the current user when one or more suspicious activities related to the user account are detected during the login session.

In some aspects of the present disclosure, authentication system 204 may simultaneously authenticate a plurality of current users accessing respective user accounts that are in session.

Although various aspects of the present disclosure are discussed with reference to a cloud computing environment, the systems and methods of authenticating a user accessing a user account may be implemented in a client-server environment. In the client-server environment, a client device such as user devices 202 may access one or more computing services provide by one or more servers or data centers via a network. The one or more servers or data centers may be owned or managed by an organization or business. Authentication system 204 as shown in and explained with reference to FIG. 2 may be implemented in the one or more servers or data centers to authenticate whether a current user accessing a user account is same as the registered user authorized to access the user account.

Figure 3:
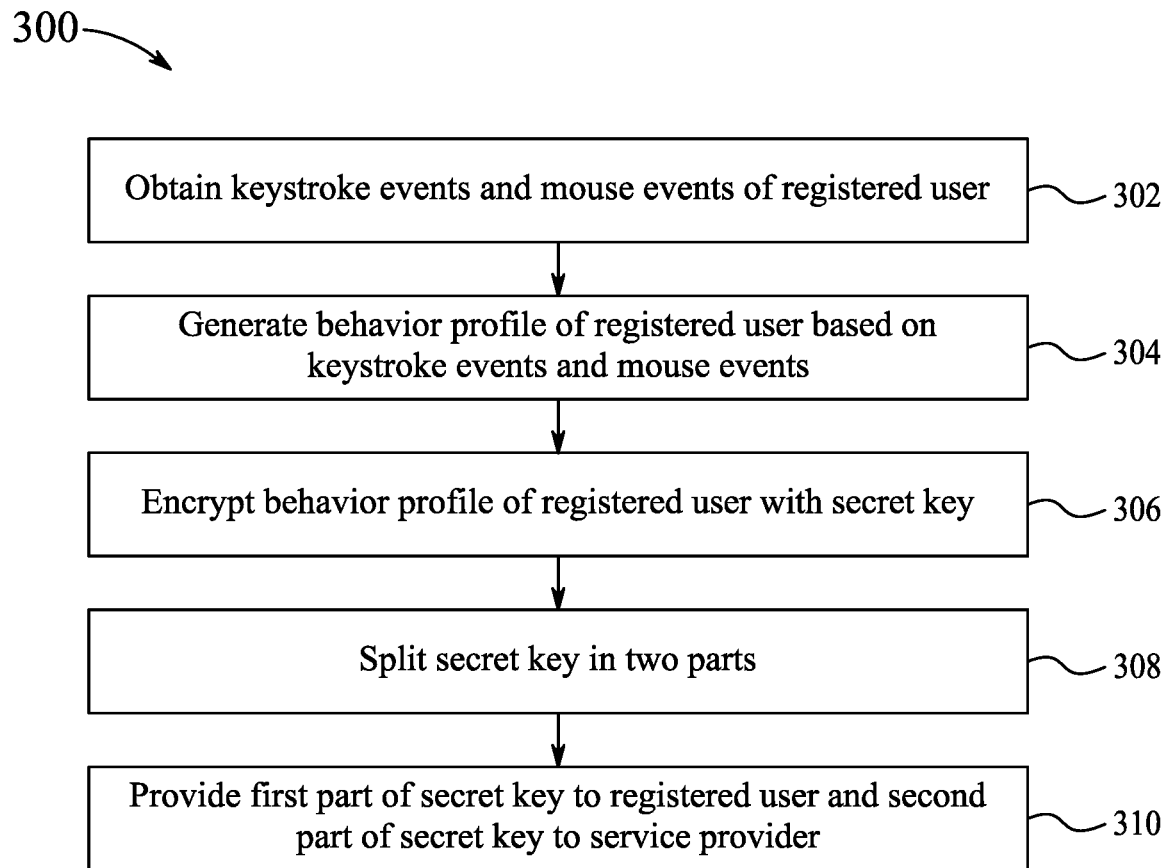
FIG. 3 illustrates a flowchart of a method for registering a behavior profile of a user registered with a user account, according to exemplary aspects of the present disclosure.

FIG. 3 illustrates a flowchart of a method 300 for registering behavior profile of a user registered with a user account, according to exemplary aspects of the present disclosure.

At step 302, the method 300 includes obtaining keystroke events and mouse events of a user registered with a user account. In an example, the user account may correspond to one or more cloud computing services provided by a cloud service provider. In some aspects of the present disclosure, behavior profile registration module 222 obtains the keystroke events and mouse events.

At step 304, the method 300 includes generating a behavior profile of the registered user based on the obtained keystroke events and mouse events. In some aspects of the present disclosure, behavior profile registration module 222 generates the behavior profile of the registered user.

At step 306, the method 300 includes encrypting the behavior profile of the registered user with an encryption key. In an example, the encryption key may correspond to a secret key (or a private key). The secret key may be used to both encrypt and decrypt the behavior profile of the registered user. In some aspects of the present disclosure, encryption module 226 encrypts the behavior profile of the registered user.

At step 308, the method 300 includes splitting the encryption key in two or more parts. Various secret sharing or splitting algorithms may be used to split the encryption key. Secret sharing or splitting refers to distributing a secret among a group of participants, each of whom is allocated a share of the secret. The secret is reconstructed only when a sufficient number of shares of the secret are combined together. Individual shares may not reconstruct the secret on their own. In an example Shamir's secret sharing algorithm may be used to split the encryption key into two or more parts. In some aspects of the present disclosure, encryption module 226 splits the encryption key in two or more parts.

At step 310, the method 300 includes providing a first part of the encryption key to the registered user and a second part of the encryption key to a service provider associated with the user account. In an example, the service provider may refer to a cloud service provider providing one or more cloud computing services to the registered user. In an example, the first part of the encryption key may be shared with the registered user via email and may be stored in a computing device associated with the user. In some aspects of the present disclosure, encryption module 226 provides the first part of the encryption key to the registered user and the second part of the encryption key to a service provider associated with the user account.

Figure 4:
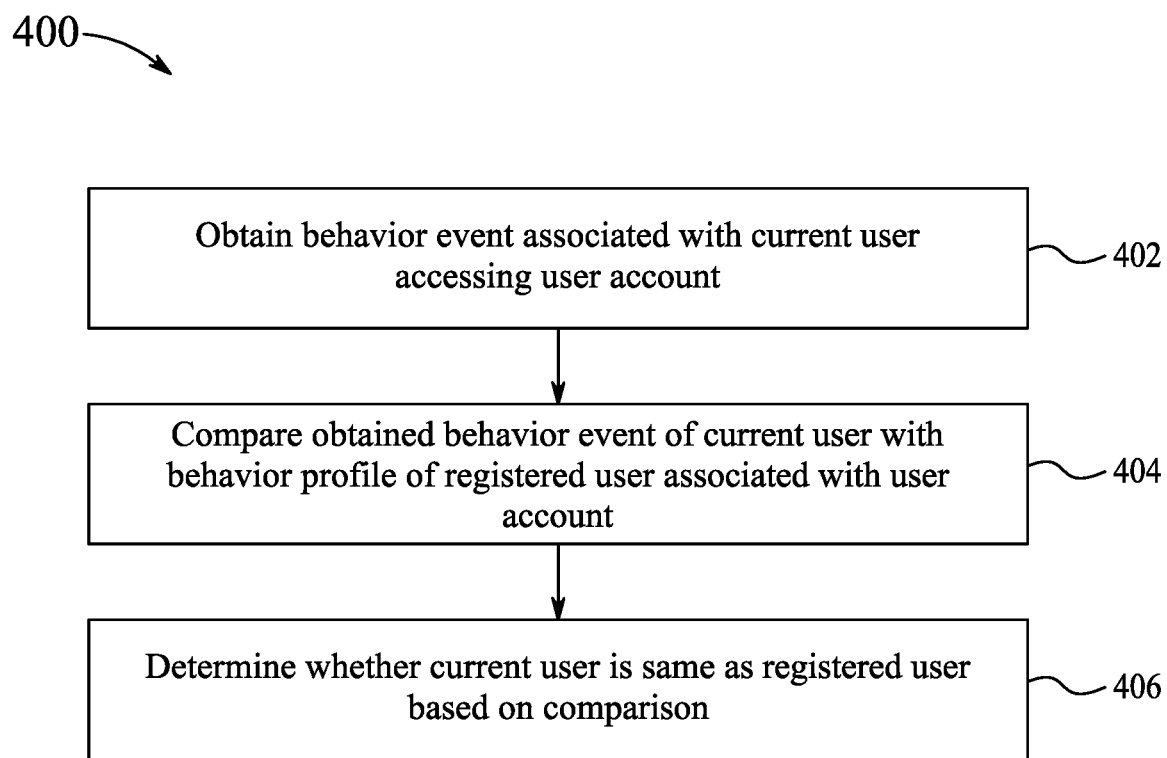
FIG. 4 illustrates a flowchart of a method for authenticating a user associated with a user account, according to exemplary aspects of the present disclosure.

FIG. 4 illustrates a flowchart of a method 400 for authenticating a user associated with a user account, according to exemplary aspects of the present disclosure.

At step 402, the method 400 includes obtaining a behavior event associated with a current user using a user account during a session. The behavior event comprises at least one of keystroke events and mouse events. The user account may be associated with a registered user. In an example, the user account may be used by the registered user to access one or more cloud computing services provided by a cloud service provider. In some aspects of the present disclosure, behavior profile authentication module 224 obtains the behavior event associated with the current user using the user account during the session.

At step 404, the method 400 includes comparing the obtained behavior event of the current user with a behavior profile of the registered user associated with the user account. The behavior profile of the registered user comprises at least one of keystroke events and mouse events associated with the registered user. In an example, the behavior profile of the registered user may be retrieved from the cloud service provider. In some aspects of the present disclosure, behavior profile authentication module 224 compares the obtained behavior event of the current user with the behavior profile of the registered user associated with the user account.

At step 406, the method 400 includes authenticating, the current user during the session, when the current user is determined to be the same as the registered user based on the comparison. In some aspects of the present disclosure, when the current user is not determined to be the same as the registered user, the current user is logged out of the user account. In some aspects of the present disclosure, behavior profile authentication module 224 authenticates the current user during the session, when the current user is determined to be the same as the registered user based on the comparison.

The first embodiment is illustrated with respect to FIGS. 1-8. The first embodiment describes a computer implemented method for authenticating a user accessing a user account. The method includes obtaining a behavior event associated with a current user using the user account during a session, wherein the behavior event comprises at least one of keystroke events and mouse events; comparing the obtained behavior event of the current user with a behavior profile of a registered user associated with the user account, wherein the behavior profile comprises at least one of keystroke events and mouse events associated with the registered user; and authenticating, the current user during the session, when the current user is determined to be the same as the registered user based on the comparison.

The method comprises providing access to the user account in response to authenticating the user based on user credentials.

The method further comprises comparing the obtained behavior event of the current user with a set of detectors $D_i$ comprising a plurality of non-self detectors, wherein the plurality of non-self detectors corresponds to detectors that are not similar to the behavior profile of the registered user; and determining a detection value indicating a number of times the obtained behavior event of the current user matches the set of detectors $D_i$.

The current user is logged out of the user account when the detection value exceeds a predetermined threshold.

The method further comprises retrieving a first encryption key and a second encryption key, wherein the first encryption key and the second encryption key are combined to form a secret key; and decrypting the set of detectors $D_i$ using the secret key.

The behavior event is compared with the behavior profile at predetermined time intervals.

The behavior event is compared with the behavior profile when one or more activities associated with accessing the user account meets a predetermined condition.

The second embodiment is illustrated with respect to FIGS. 1-8. The second embodiment describes a computer implemented method for registering a behavior profile of a user registered with a user account. The method includes obtaining at least one of keystroke events and mouse events of the registered user; generating a behavior profile of the registered user based on the at least one of obtained keystroke events and mouse events; encrypting the behavior profile of the registered user with a first secret key; splitting the first secret key in at least two parts; and providing a first part of the first secret key to the registered user and a second part of the first secret key to a service provider associated with the user account.

The method further comprises retrieving the behavior profile of the registered user; when the registered user is accessing the user account, generating a plurality of detectors from the behavior profile; determining a plurality of self detectors that matches the behavior profile and a plurality of non-self detectors that does not match the behavior profile; and generating a set of detectors $D_i$ comprising the plurality of non-self detectors.

The method further comprises encrypting the set of detectors $D_i$ with a second secret key; splitting the second secret key in at least two parts; and providing a first part of the second secret key to the registered user and a second part of the second secret key to the service provider associated with the user account.

The behavior profile is generated by obtaining a plurality of samples of the at least one of keystroke events and mouse events at predetermined time intervals.

The third embodiment is illustrated with respect to FIGS. 1-8. The third embodiment describes a system for authenticating a user accessing a user account, the system comprising a cloud server. The cloud server is communicatively coupled to one or more client devices. The cloud server includes one or more processors configured to: obtain a behavior event associated with a current user using the user account during a session from the one or more client device, wherein the behavior event comprises at least one of keystroke events and mouse events; compare the obtained behavior event of the current user with a behavior profile of a registered user associated with the user account, wherein the behavior profile comprises at least one of keystroke events and mouse events associated with the registered user;

and authenticating, the current user during the session, when the current user is determined to be the same as the registered user based on the comparison.

The one or more processors are configured to provide access to the user account in response to authenticating the user based on user credentials.

The one or more processors are further configured to: compare the obtained behavior event of the current user with a set of detectors $D_i$ comprising a plurality of non-self detectors, wherein the plurality of non-self detectors corresponds to detectors that are not similar to the behavior profile of the registered user; and determine a detection value indicating a number of times the obtained behavior event of the current user matches the set of detectors $D_i$.

The one or more processors are configured to log out the current user from the user account when the detection value exceeds a predetermined threshold.

The one or more processors are further configured to: retrieve a first encryption key and a second encryption key, wherein the first encryption key and the second encryption key are combined to form a secret key; and decrypt the set of detectors $D_i$ using the secret key.

The one or more processors are configured to compare the behavior event with the behavior profile at predetermined time intervals.

The one or more processors are configured to compare the behavior event with the behavior profile when one or more activities associated with accessing the user account meets a predetermined condition.

The fourth embodiment is illustrated with respect to FIGS. 1-8. The fourth embodiment describes a system for registering a behavior profile of a user registered with a user account. The system comprises one or more processors configured to: obtain at least one of keystroke events and mouse events of the registered user; generate a behavior profile of the registered user based on the at least one of obtained keystroke events and mouse events; encrypt the behavior profile of the registered user with a first secret key; split the first secret key in at least two parts; and provide a first part of the first secret key to the registered user and a second part of the first secret key to a service provider associated with the user account.

The one or more processors are further configured to: retrieve the behavior profile of the registered user; when the registered user is accessing the user account, generate a plurality of detectors from the behavior profile; determine a plurality of self detectors that matches the behavior profile and a plurality of non-self detectors that does not match the behavior profile; and generate a set of detectors $D_i$ comprising the plurality of non-self detectors.

The one or more processors are further configured to encrypt the set of detectors $D_i$ with a second secret key; split the second secret key in at least two parts; and provide a first part of the second secret key to the registered user and a second part of the second secret key to the service provider associated with the user account.

The one or more processors are configured to generate the behavior profile by obtaining a plurality of samples of the at least one of keystroke events and mouse events at predetermined time intervals.

FIG. 5 is an illustration of a non-limiting example of details of computing hardware used in the computing system, according to exemplary aspects of the present disclosure. In FIG. 5, a controller 500 is described which is a computing device and includes a CPU 501 which performs the processes described above/below. The process data and instructions may be stored in memory 502. These processes and instructions may also be stored on a storage medium disk 504 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 501, 503 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 501 or CPU 503 may be a Xenon or Core processor from Intel of America or an Opteron processor from AMD of America, or may be other processor types that would be recognized by one of ordinary skill in the art. Alternatively, the CPU 501, 503 may be implemented on an FPGA, ASIC, PLD or using discrete logic circuits, as one of ordinary skill in the art would recognize. Further, CPU 501, 503 may be implemented as multiple processors cooperatively working in parallel to perform the instructions of the inventive processes described above.

The computing device in FIG. 5 also includes a network controller 506, such as an Intel Ethernet PRO network interface card from Intel Corporation of America, for interfacing with network 560. As can be appreciated, network 560 can be a public network, such as the Internet, or a private network such as an LAN or WAN network, or any combination thereof and can also include PSTN or ISDN sub-networks. Network 560 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 interfaces with a keyboard and/or mouse 514 as well as a touch screen panel 516 on or separate from display 510. General purpose I/O interface also connects to a variety of peripherals 518 including printers and scanners, such as an OfficeJet or DeskJet from Hewlett Packard.

A sound controller 520 is also provided in the computing device such as Sound Blaster X-Fi Titanium from Creative, to interface with speakers/microphone 522 thereby providing sounds and/or music.

The general-purpose storage controller 524 connects the storage medium disk 504 with communication bus 526, which may be an ISA, EISA, VESA, PCI, or similar, for interconnecting all of the components of the computing device. A description of the general features and functionality of the display 510, keyboard and/or mouse 514, as well as the display controller 508, storage controller 524, network controller 506, sound controller 520, and general purpose I/O interface 512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 6.

FIG. 6 shows a schematic diagram of a data processing system 600 used within the computing system, according to exemplary aspects of the present disclosure. The data processing system 600 is an example of a computer in which code or instructions implementing the processes of the illustrative aspects of the present disclosure may be located.

In FIG. 6, data processing system 600 employs a hub architecture including a north bridge and memory controller hub (NB/MCH) 625 and a south bridge and input/output (I/O) controller hub (SB/ICH) 620. The central processing unit (CPU) 630 is connected to NB/MCH 625. The NB/MCH 625 also connects to the memory 645 via a memory bus, and connects to the graphics processor 650 via an accelerated graphics port (AGP). The NB/MCH 625 also connects to the SB/ICH 620 via an internal bus (e.g., a unified media interface or a direct media interface). The CPU Processing unit 630 may contain one or more processors and even may be implemented using one or more heterogeneous processor systems.

For example, FIG. 7 shows one aspects of the present disclosure of CPU 630. In one aspects of the present disclosure, the instruction register 738 retrieves instructions from the fast memory 740. At least part of these instructions is fetched from the instruction register 738 by the control logic 736 and interpreted according to the instruction set architecture of the CPU 730. Part of the instructions can also be directed to the register 730. In one aspects of the present disclosure the instructions are decoded according to a hardwired method, and in another aspects of the present disclosure the instructions are decoded according a microprogram that translates instructions into sets of CPU configuration signals that are applied sequentially over multiple clock pulses. After fetching and decoding the instructions, the instructions are executed using the arithmetic logic unit (ALU) 734 that loads values from the register 732 and performs logical and mathematical operations on the loaded values according to the instructions. The results from these operations can be feedback into the register and/or stored in the fast memory 740. According to certain aspects of the present disclosures, the instruction set architecture of the CPU 730 can use a reduced instruction set architecture, a complex instruction set architecture, a vector processor architecture, a very large instruction word architecture. Furthermore, the CPU 730 can be based on the Von Neuman model or the Harvard model. The CPU 630 can be a digital signal processor, an FPGA, an ASIC, a PLA, a PLD, or a CPLD. Further, the CPU 630 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 6, the data processing system 600 can include that the SB/ICH 620 is coupled through a system bus to an I/O Bus, a read only memory (ROM) 656, universal serial bus (USB) port 664, a flash binary input/output system (BIOS) 668, and a graphics controller 658. PCI/PCIe devices can also be coupled to SB/ICH 620 through a PCI bus 662.

The PCI devices may include, for example, Ethernet adapters, add-in cards, and PC cards for notebook computers. The Hard disk drive 660 and CD-ROM 656 can use, for example, an integrated drive electronics (IDE) or serial advanced technology attachment (SATA) interface. In one aspects of the present disclosure the I/O bus can include a super I/O (SIO) device.

Further, the hard disk drive (HDD) 660 and optical drive 666 can also be coupled to the SB/ICH 620 through a system bus. In one aspects of the present disclosure, a keyboard 670, a mouse 672, a parallel port 678, and a serial port 676 can be connected to the system bus through the I/O bus. Other peripherals and devices that can be connected to the SB/ICH 620 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 8:
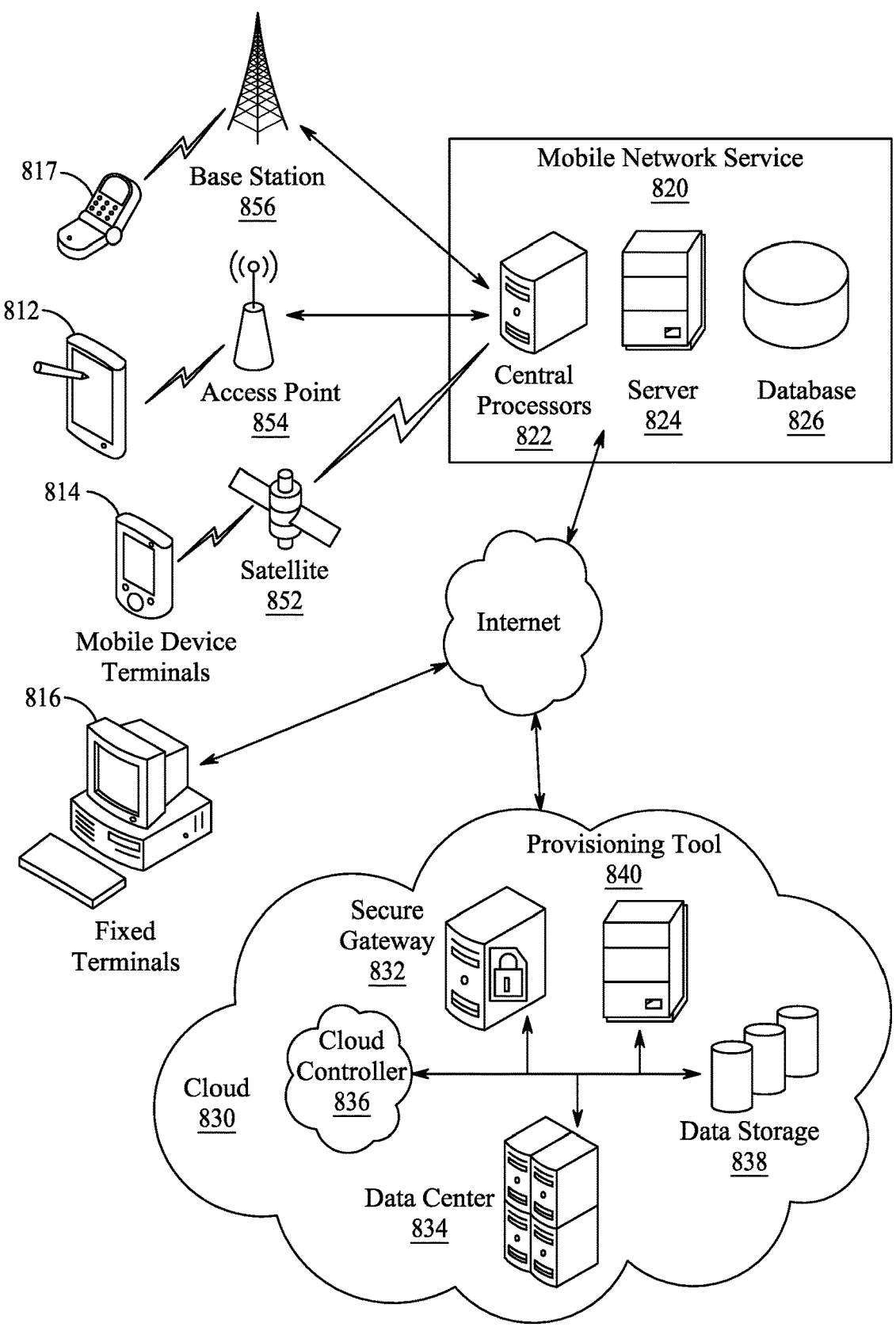
FIG. 8 is an illustration of a non-limiting example of distributed components which may share processing with the controller, according to exemplary aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 8, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the disclosure may be practiced otherwise than as specifically described herein.

What is claimed is:

1. A computer implemented method for authenticating a user for accessing an account of the user, comprising:
obtaining a behavior event associated with a current user using the account of the user during a session, wherein the behavior event comprises at least one of keystroke events and mouse events;
comparing the obtained behavior event of the current user with a behavior profile of a registered user associated with the account of the user, wherein the behavior profile comprises at least one of keystroke events and mouse events associated with the registered user; and
authenticating, the current user during the session, when the current user is determined to be the same as the registered user based on the comparison, wherein the current user is logged out of the account of the user when a detection value exceeds a predetermined threshold, wherein the detection value is a number of times the obtained behavior event of the current users matches a set of detectors $D_i$ comprising a plurality of non-self detectors that are not similar to the behavior profile of the registered user.

2. The method of claim 1 further comprising:
providing the current user access to the account of the user in response to authenticating the current user based on user credentials.

3. The method of claim 1, wherein the behavior event is compared with the behavior profile at predetermined time intervals.

4. The method of claim 1, wherein the behavior event is compared with the behavior profile when one or more activities associated with accessing the account of the user meets a predetermined condition.

5. The method of claim 1, wherein the keystroke events and mouse events include one or more of time duration for which a key is pressed, time duration between consecutive keystrokes, time duration between mouse button press and release for a single click action, time duration between mouse button press and release for each click for a double click action, time duration between first mouse button release and second mouse button press for a double click action, a sequence of mouse movement actions, a mouse drag and drop action, and a scroll action.

6. A system for authenticating a user for accessing an account of the user, comprising:
a cloud server, the cloud server communicatively coupled to one or more client devices, the cloud server having one or more processors configured to:
obtain a behavior event associated with a current user using the account of the user during a session from the one or more client devices, wherein the behavior event comprises at least one of keystroke events and mouse events;
compare the obtained behavior event of the current user with a behavior profile of a registered user associated with the account of the user, wherein the behavior profile comprises at least one of keystroke events and mouse events associated with the registered user;
authenticate, the current user during the session, when the current user is determined to be the same as the registered user based on the comparison; and
log out the current user from the account of the user when a detection value exceeds a predetermined threshold, wherein the detection value is a number of times the obtained behavior event of the current users matches a set of detectors $D_i$ comprising a plurality of non-self detectors that are not similar to the behavior profile of the registered user.

7. The system of claim 6, wherein the one or more processors are further configured to provide the current user access to the account of the user in response to authenticating the current user based on user credentials.

8. The system of claim 6, wherein the one or more processors are configured to compare the behavior event with the behavior profile at predetermined time intervals.

9. The system of claim 6, wherein the one or more processors are configured to compare the behavior event with the behavior profile when one or more activities associated with accessing the account of the user meets a predetermined condition.

10. The system of claim 6, wherein the keystroke events and mouse events include one or more of time duration for which a key is pressed, time duration between consecutive keystrokes, time duration between mouse button press and release for a single click action, time duration between mouse button press and release for each click for a double click action, time duration between first mouse button release and second mouse button press for a double click action, a sequence of mouse movement actions, a mouse drag and drop action, and a scroll action.

* * * * *